(12) United States Patent
Ohmura et al.

(10) Patent No.: US 6,917,330 B2
(45) Date of Patent: Jul. 12, 2005

(54) POSITIONING SYSTEM

(75) Inventors: Yuji Ohmura, Tokyo (JP); Masayuki Saito, Tokyo (JP); Tadanobu Ohke, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 501 days.

(21) Appl. No.: 09/984,136

(22) Filed: Oct. 29, 2001

(65) Prior Publication Data

US 2003/0008666 A1 Jan. 9, 2003

(30) Foreign Application Priority Data

Jul. 9, 2001 (JP) ........................................ 2001-207696

(51) Int. Cl.[7] .............................................. G01S 5/14
(52) U.S. Cl. .............................................. 342/357.15
(58) Field of Search ...................... 342/357.02, 357.06, 342/357.15

(56) References Cited

U.S. PATENT DOCUMENTS

| | | | | |
|---|---|---|---|---|
| 4,928,107 A | * | 5/1990 | Kuroda et al. | 342/357.15 |
| 5,155,688 A | | 10/1992 | Tanaka et al. | |
| 5,323,163 A | * | 6/1994 | Maki | 342/357.15 |
| 5,373,298 A | * | 12/1994 | Karouby | 342/357.02 |

FOREIGN PATENT DOCUMENTS

| JP | A3-72285 | 3/1991 |
|---|---|---|
| JP | A3-108681 | 5/1991 |

OTHER PUBLICATIONS

Virball, V.G. et al "A GPS Integrity Channel Based Fault Detection and Exclusion Alogrithm using Maximum solution Separation," IEEE PLANS '94, Apr. 1994, pp. 747–754.*

Tsuchiya et al., "Basis of GPS Surveying", p. 93 w/ English language summary.

* cited by examiner

*Primary Examiner*—Gregory C. Issing
(74) *Attorney, Agent, or Firm*—Birch, Stewart, Kolasch & Birch, LLP

(57) ABSTRACT

In order to solve a conventional problem that precision deterioration that cannot be determined by only a DOP, a positioning system is provided which comprises: a receiver for receiving signals from a plurality of positioning satellites to output data received from satellites; a satellite selector for selecting a plurality of combinations of positioning satellites to be objects of positioning calculation based on the data received from satellites to output satellite combination data; a positioning calculator for performing positioning calculation based on the data received from satellites and the satellite combination data to output positioning results thereof; a velocity detector for detecting a velocity of the positioning system to output velocity data; and a positioning output determining unit for selecting a positioning result closest to a predicted position out of the positioning results to output the positioning result as a positioning output.

20 Claims, 11 Drawing Sheets

FIG. 11
CONVENTIONAL ART $$A = \begin{bmatrix} \alpha_1 & \beta_1 & \gamma_1 & 1 \\ \alpha_2 & \beta_2 & \gamma_2 & 1 \\ \alpha_3 & \beta_3 & \gamma_3 & 1 \\ \alpha_4 & \beta_4 & \gamma_4 & 1 \end{bmatrix}$$

$$\alpha = \frac{\partial}{\partial x} \rho$$

$$\beta = \frac{\partial}{\partial y} \rho$$

$$\gamma = \frac{\partial}{\partial z} \rho$$

$$\text{GDOP} = \sqrt{\text{Trace}\,(A^T \cdot A)^{-1}}$$

POSITIONING SYSTEM

This application is based on Application No. 2001-207696, filed in Japan on Jul. 9, 2001, the contents of which are hereby incorporated by reference.

BACKGROUND OF THE INVENTION

1. Field of the Invention

The present invention relates to a positioning system for receiving signals from a positioning satellite or an apparatus similar to a positioning satellite to perform the positioning thereof, and in particular, to a positioning system for performing positioning with respect to a moving object. A positioning satellite or a satellite referred to in the following description shall include an apparatus similar to a positioning satellite unless specifically described.

2. Description of the Related Art

In positioning performed by receiving signals from a positioning satellite or from an apparatus similar to the positioning satellite, one of the factors which affects the precision thereof is a satellite arrangement. A degree of influence on the precision of the satellite arrangement is called "DOP: Dilution of Precision," which can be calculated using schematic trajectory information of the positioning satellite. In a conventional positioning system, the DOP is generally used as an index for selecting the positioning satellite in order to use it upon positioning. This is indicated, for example, on page 93 of "Revised "Basis of GPS surveying", Jun Tsuchiya and Hiromichi Tsuji," Japan Association of Surveyors.

A conventional positioning system will now be described with reference to a drawing. FIG. 10 is a simplified block diagram showing an example of a configuration of an N channel receiver of positioning satellite signals that forms a part of the conventional positioning system.

In FIG. 10, reference numeral 1 denotes an N channel receiver of positioning satellite signals, 81 denotes an antenna, 82 denotes an amplifier, 83 denotes a mixer, 84 denotes an IF, 85 denotes an AD converter, 86 denotes correlation detecting DLLs and 87 denotes decoders.

Operations of the conventional positioning system will be described next with reference to a drawing.

Electric waves from each positioning satellite have a substantially identical frequency. However, the electric waves can be identified by a correlator because they are not CDMA converted by particular data. Since the frequency of electric waves from each satellite is fluctuated by the Doppler effect of the like, it is necessary to follow it by the DLL. Received data of each satellite is thereafter obtained by a decoder.

Since a detected part can be digitized, detection circuits normally in the order of 8 channels to 16 channels can operate simultaneously to follow signals from the individual positioning satellites. Since the number of positioning satellites is larger than the number of channels of a receiver, each channel does not always follow a particular positioning satellite. Therefore, an N channel output of a receiver includes an identification number of a positioning satellite. The received data further includes a pseudo distance ρ between the positioning satellite and the receiver, trajectory parameters of the positioning satellite or the like.

FIG. 11 shows a method of calculating a GDOP (Geometrical DOP) that is a kind of the DOP.

A matrix A shown in FIG. 11 is generally called a design matrix. Each line of the matrix A corresponds to each positioning satellite i to be used in positioning. A first row is a partial differential coefficient $\alpha_i$ in the x direction of a pseudo distance $\rho_i$ that can be calculated from a signal of the positioning satellite i. Second and third rows are partial differential coefficients $\beta_i$ and $\gamma_i$ in the y and z directions of the same.

In FIG. 11, the design matrix has four lines, which means that a positioning calculation is performed using four satellites. In the positioning calculation, the number of positioning satellites is not limited to four.

The GDOP is defined by a square root of a diagonal element sum of $(A^T \cdot A)^{-1}$. Here, $A^T$ is a transposed matrix of the matrix A, $A^T \cdot A$ is a product of the transposed matrix $A^T$ and the matrix A, and $(A^T \cdot A)^{-1}$ is an inverse matrix of the matrix $(A^T \cdot A)$.

While the precision of a positioning calculation has been conventionally grasped using such indexes, degradation of the precision that cannot be determined by the DOP occurs due to quality degradation of a signal received from the each of the positioning satellites, degradation of trajectory information of each of the positioning satellites or the like.

The quality degradation of a signal is exemplified by the case in which a signal is not directly received from the positioning satellite but is reflected by an obstacle around the positioning satellite to be received, and the case in which, if an angle of elevation of the positioning satellite in a positioning position is low, a propagation distance in the atmosphere becomes longer to make a propagation delay larger.

SUMMARY OF THE INVENTION

The present invention has been devised in order to solve the above-mentioned problem, and it is an object of the present invention to realize a positioning system that can determine precision of a positioning calculation using an index different from the DOP.

A positionings system according to a first aspect of the invention comprises: a receiver for receiving signals from a plurality of positioning satellites to output data received from satellites; a satellite selector for selecting a plurality of combinations of positioning satellites to be objects of positioning calculation based on the data received from satellites to output satellite combination data; a positioning calculator for performing positioning calculation based on the data received from satellites and the satellite combination data to output positioning results thereof; and a positioning output determining unit for selecting a positioning result closest to a predicted position out of the positioning results to output the positioning result as a positioning output. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a second aspect of the present invention, the satellite selector includes: a satellite combination generator for generating second satellite combination data that combines the data received from satellites; a DOP calculator for calculating a DOP using the second satellite combination data based on the data received from satellites to output a DOP value; an aligning selector for aligning the plurality of DOP values to select a subset according to sizes of the values; and a combination data selecting and outputting unit for selecting a subset of outputs of the satellite combination generator using outputs of the aligning selector to output the satellite combination data. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a third aspect of the present invention, the positioning output determining unit includes: a positioning output selector for selecting a positioning result closest to a predicted position using the positioning results and a difference between the positioning results and the predicted position to output the positioning result as a positioning output; a trajectory predictor for predicting a trajectory of the positioning system using the positioning output to output the predicted position; and a difference calculation unit for calculating a difference between the positioning results and the predicted position. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a fourth aspect of the present invention, the trajectory predictor includes: a first coordinate converter for converting a coordinate system of the positioning output to a first coordinate system expressed by a latitude, a longitude and an altitude; an trajectory calculator for performing trajectory predicting calculation using a predetermined model based on the first coordinate system and outputting a predicted value of a second coordinate system expressed by a latitude, a longitude and an altitude; and a second coordinate converter for converting the predicted value of the second coordinate system to the coordinate system of the predicted position. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a fifth aspect of the present invention, the trajectory calculator performs trajectory predicting calculation on an assumption that the positioning system is taking a uniform acceleration motion. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a sixth aspect of the present invention, the positioning output determining unit includes: a plurality of positioning outputs selector for selecting a plurality of positioning results close to the predicted position using the positioning result and a difference between the positioning result and the predicted position to output them as selected outputs; a positioning output calculator for calculating a positioning position using a plurality of selected outputs of the plurality of positioning outputs selector to output it as a positioning output; a trajectory predictor for predicting a trajectory of the positioning system using the positioning output to output the predicted position; and a difference calculation unit for calculating a difference between the positioning result and the predicted position. As a result, it becomes possible to eliminate an error factor that is likely to be included in a selected one positioning result, and in addition, there is an effect that a more precise positioning result using information of a plurality of positioning satellites can be outputted by performing a calculation of a positioning output using a plurality of positioning results.

In a positioning system according to a seventh aspect of the present invention, the trajectory predictor includes: a first coordinate converter for converting a coordinate system of the positioning output to a first coordinate system expressed by a latitude, a longitude and an altitude; a trajectory calculator for performing a trajectory predicting calculation using a predetermined model based on the first coordinate system and outputting a predicted value of a second coordinate system expressed by a latitude, a longitude and an altitude, and at the same time outputting a predicted value of coordinate system fluctuation for predicting that a trajectory of the positioning system fluctuates from a coordinate system currently used; a second coordinate converter for converting the predicted value of the second coordinate system to the coordinate system of the predicted position; and a coordinate system updating unit for updating a coordinate system to be used in trajectory predicting calculation based on the predicted value of coordinate system fluctuation. As a result, there is an effect that a more precise positioning result using information of a plurality of positioning satellites can be outputted.

In a positioning system according to an eighth aspect of the present invention, the trajectory calculator performs a trajectory predicting calculation on an assumption that the positioning system is moving on a predetermined straight line. As a result, there is an effect that a more precise positioning result using information of a plurality of positioning satellites can be outputted.

In a positioning system according to a ninth aspect of the present invention, the coordinate system updating unit includes: a generator of coordinate system updating conversion matrix for calculating an angle deviation between each coordinate axis and a predicted trajectory using the predicted value of coordinate system fluctuation to generate a coordinate system updating conversion matrix that rotates a coordinate conversion matrix in the direction for compensating for the angle deviation; and a conversion matrix updating unit for applying the coordinate system updating conversion matrix to a present conversion matrix to update the conversion matrix. As a result, there is an effect that a more precise positioning result using information of a plurality of positioning satellites can be outputted.

A positioning system according to a tenth aspect of the present invention comprises: a receiver for receiving signals from a plurality of positioning satellites to output data received from satellites; a satellite selector for selecting a plurality of combinations of positioning satellites to be objects of positioning calculation based on the data received from satellites to output satellite combination data; a positioning calculator for performing positioning calculation based on the data received from satellites and the satellite combination data to output positioning results thereof; a velocity detector for detecting a velocity of the positioning system to output velocity data; and a positioning output determining unit for selecting a positioning result closest to a predicted position out of the positioning results to output the positioning result as a positioning output using the velocity data. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to an eleventh aspect of the present invention, the satellite selector includes: a satellite combination generator for generating second satellite combination data that combines the data received from satellites; a DOP calculator for calculating a DOP using the second satellite combination data based on the data received from satellites to output a DOP value; an aligning selector for aligning the plurality of DOP values, thereby selecting a subset according to sizes of the values; and a combination data selecting and outputting unit for selecting a subset of outputs of the satellite combination generator using outputs of the aligning selector to output the satellite combination data. As a result, there is an effect that the positioning becomes possible, which can also cope with precision degradation or the like not correlated to a DOP, and moreover, it becomes possible to generate a smooth positioning trajectory output result by performing orbit trajectory prediction of the positioning system, whereby being capable of eliminating a sudden disturbance.

In a positioning system according to a twelfth aspect of the present invention, the positioning output determining unit includes: a positioning output selector for selecting a positioning result closest to a predicted position using the positioning results and a difference between the positioning results and the predicted position to output the positioning result as a positioning output; an trajectory predictor for predicting a trajectory of a positioning system using the positioning output and the velocity data to output the predicted position; and a difference calculation unit for calculating a difference between the positioning results and the predicted position. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a thirteenth aspect of the present invention, the trajectory predictor includes: a first coordinate converter for converting a coordinate system of the positioning output to a first coordinate system expressed by a latitude, a longitude and an altitude; a second coordinate converter for converting a coordinate system of the velocity data to a second coordinate system expressed by a latitude, a longitude and an altitude; a trajectory calculator for performing trajectory predicting calculation using a predetermined model based on the first and second systems of coordinates and outputting a predicted value of a third coordinate system expressed by a latitude, a longitude and an altitude; and a third coordinate converter for converting the predicted value of the third coordinate system to the coordinate system of the predicted position. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a fourteenth aspect of the present invention, the trajectory calculator performs the trajectory predicting calculation on an assumption that the positioning system is taking a uniform acceleration motion. As a result, there is an effect that the positioning becomes possible, which can also cope with precision degradation or the like not correlated to a DOP, and moreover, it becomes possible to generate a smooth positioning trajectory output result by performing trajectory prediction of a positioning system, whereby being capable of eliminating a sudden disturbance.

In a positioning system according to a fifteenth aspect of the present invention, the positioning output determining unit includes: a plurality of positioning outputs selector for selecting a plurality of positioning results close to the predicted position using the positioning result and a difference between the positioning result and a predicted position to output them as selected outputs; a positioning output calculator for calculating a positioning position using a plurality of selected outputs of the plurality of positioning outputs selector to output it as a positioning output; a trajectory predictor for predicting a trajectory of the positioning system using the positioning output and the velocity data to output the predicted position; and a difference calculation unit for calculating a difference between the positioning result and the predicted position.

In a positioning system according to a sixteenth aspect of the present invention, the trajectory predictor includes: a first coordinate converter for converting a coordinate system of the positioning output to a first coordinate system expressed by a latitude, a longitude and an altitude; a second coordinate converter for converting a coordinate system of the velocity data to a second coordinate system expressed by a latitude, a longitude and an altitude; a trajectory calculator for performing trajectory predicting calculation using a predetermined model based on the first and second systems of coordinates and outputting a predicted value of a third coordinate system expressed by a latitude, a longitude and an altitude, and at the same time outputting a predicted value of coordinate system fluctuation for predicting that a trajectory of the positioning system fluctuates from a coordinate system currently used; a third coordinate converter for converting the predicted value of the third coordinate system to the coordinate system of the predicted position; and a coordinate system updating unit for updating a coordinate system to be used in trajectory predicting calculation based on the predicted value of coordinate system fluctuation. As a result, there is an effect that a more precise positioning result using information of a plurality of positioning satellites can be outputted.

In a positioning system according to a seventeenth aspect of the present invention, the trajectory calculator performs trajectory predicting calculation on an assumption that the positioning system is moving on a predetermined straight line. As a result, there is an effect that a more precise positioning result using information of a plurality of positioning satellites can be outputted.

In a positioning system according to an eighteenth aspect of the present invention, the coordinate system updating unit includes: a generator of coordinate system updating conversion matrix for calculating an angle deviation between each coordinate axis and a predicted trajectory using the predicted value of coordinate system fluctuation to generate a coordinate system updating conversion matrix that rotates a coordinate conversion matrix in a direction for compensating for the angle deviation; and a conversion matrix updating unit for applying the coordinate system updating conversion matrix to a present conversion matrix to update the conversion matrix. As a result, there is an effect that a more precise positioning result using information of a plurality of positioning satellites can be outputted.

BRIEF DESCRIPTION OF THE DRAWINGS

In the accompanying drawings:

FIG. 11 shows a method of calculating a GDOP.

DETAILED DESCRIPTION OF THE PREFERRED EMBODIMENTS

First Embodiment

Figure 1:
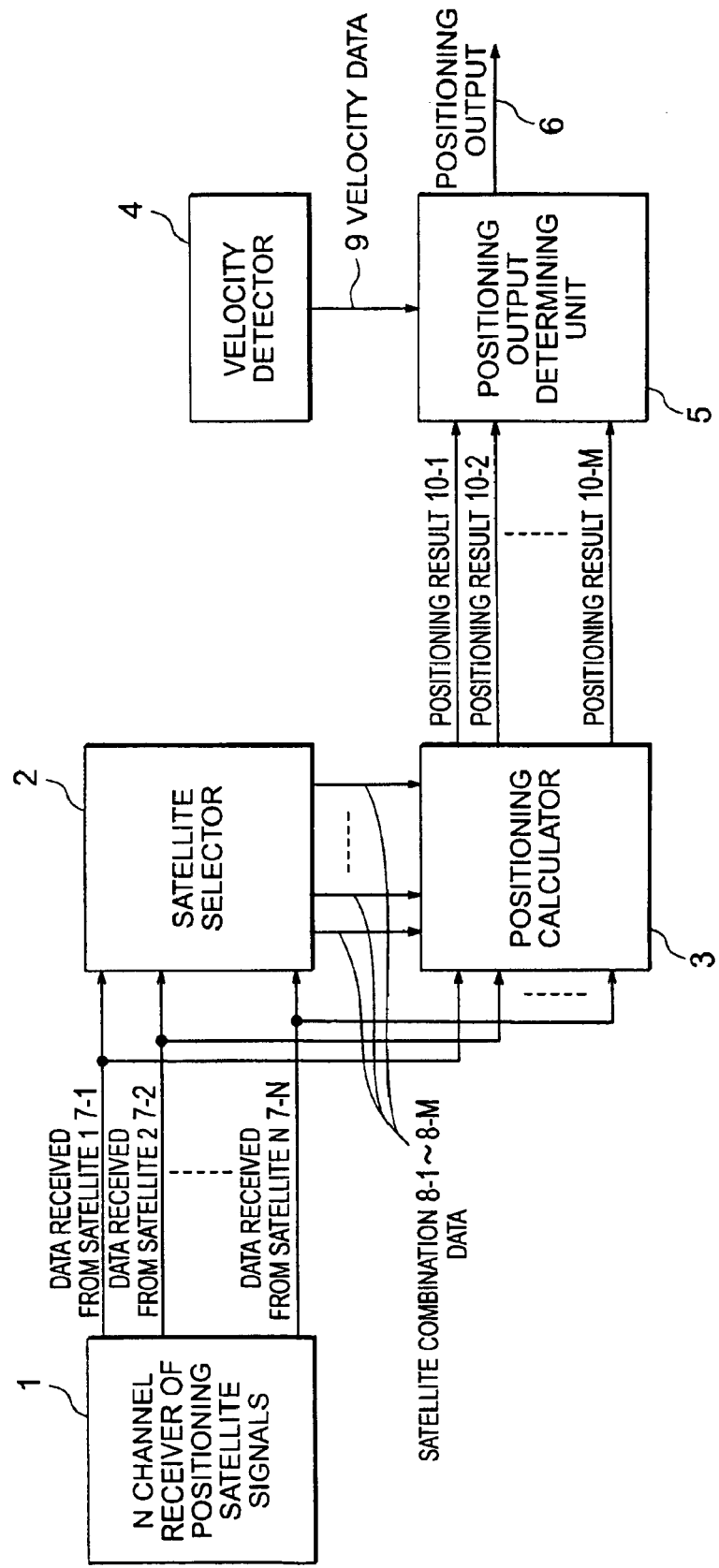
FIG. 1 is a block diagram showing a configuration of a positioning system in accordance with a first embodiment of the present invention.

A positioning system in accordance with a first embodiment of the present invention will be described with reference to the accompanying drawings. FIG. 1 is a block diagram showing a configuration of the positioning system in accordance with the first embodiment of the present invention. Note that, identical reference numerals denote identical or equivalent portions in each drawing.

In FIG. 1, reference numeral 1 denotes an N channel receiver of positioning satellite signals, 2 denotes a satellite selector, 3 denotes a positioning calculator, 4 denotes a velocity detector and 5 denotes a positioning output determining unit.

In this figure, reference numeral 6 denotes a positioning output that is an output of the positioning output determining unit 5, 7-1 to 7-N denote pieces of data received from satellites that are N outputs of the N channel receiver of positioning satellite signals 1, 8-1 to 8-M denote M pieces of satellite combination data selected by the satellite selector 2, 9 denotes velocity data that is an output of the velocity detector 4, and 10-1 to 10-M denote M positioning results corresponding to the inputs 8-1 to 8-M to the positioning calculator 3.

Figure 2:
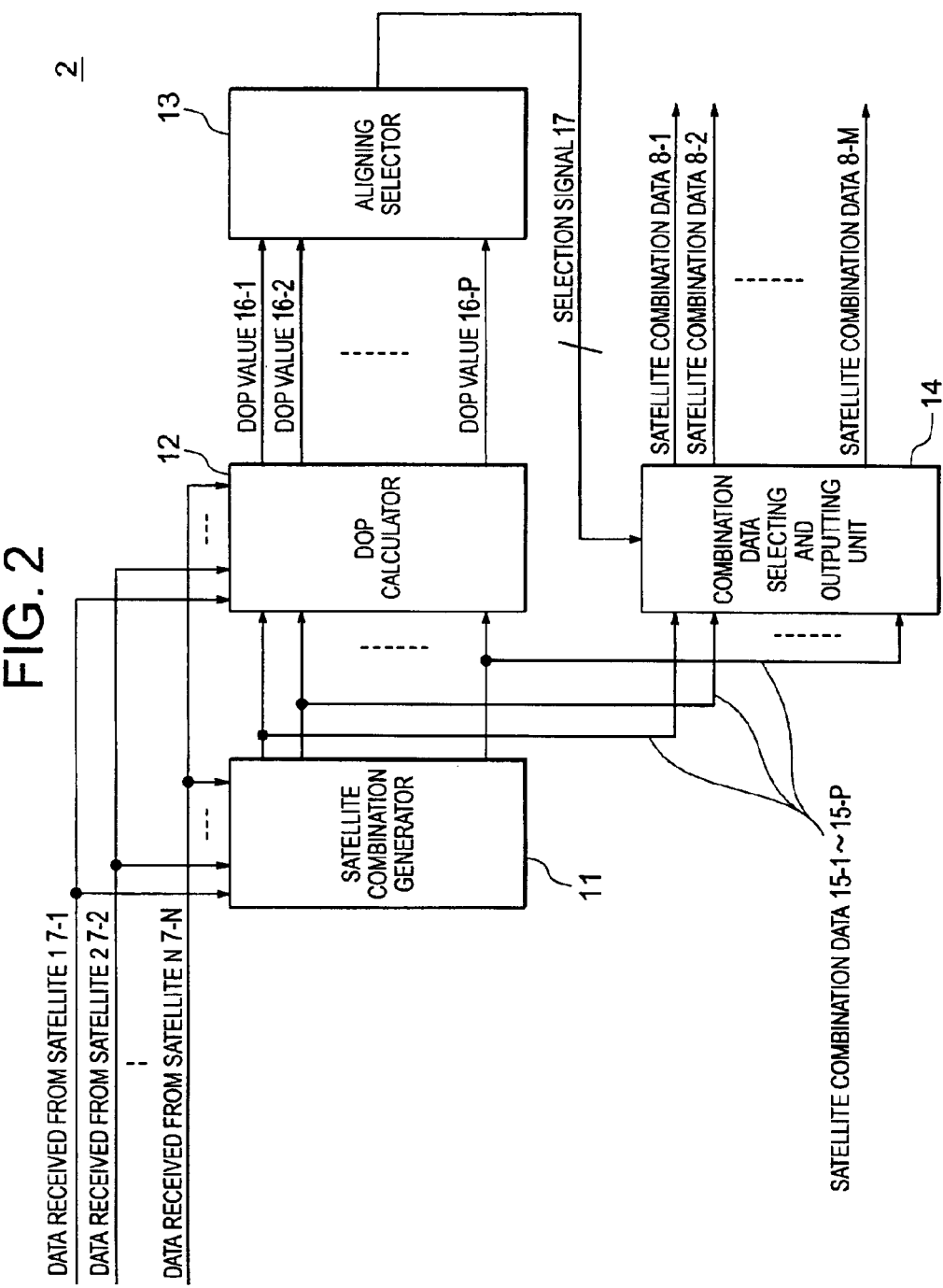
FIG. 2 is a block diagram showing a configuration of a satellite selector of the positioning system in accordance with the first embodiment of the present invention.

FIG. 2 is a block diagram showing a configuration of the satellite selector of the positioning system in accordance with the first embodiment.

In FIG. 2, reference numeral 11 denotes a satellite combination generator for generating pieces of satellite combination data 8 that are the data in which data received from satellites 7-1 to 7-N are combined, 12 denotes a DOP calculator for calculating a DOP using the satellite combination data, 13 denotes an aligning selector for aligning a plurality of DOP values to thereby select a subset according to sizes of the values, and 14 denotes a combination data selecting and outputting unit for selecting and outputting a subset of an output of the satellite combination generator 11 using an output of the aligning selector 13.

In addition, in this figure, reference numerals 15-1 to 15-P denote pieces of satellite combination data that are outputs of the satellite combination generator 11, 16-1 to 16-P denote DOP values that are outputs of the DOP calculator 12, and 17 denotes a selection signal that is an output of the aligning selector 13.

Figure 3:
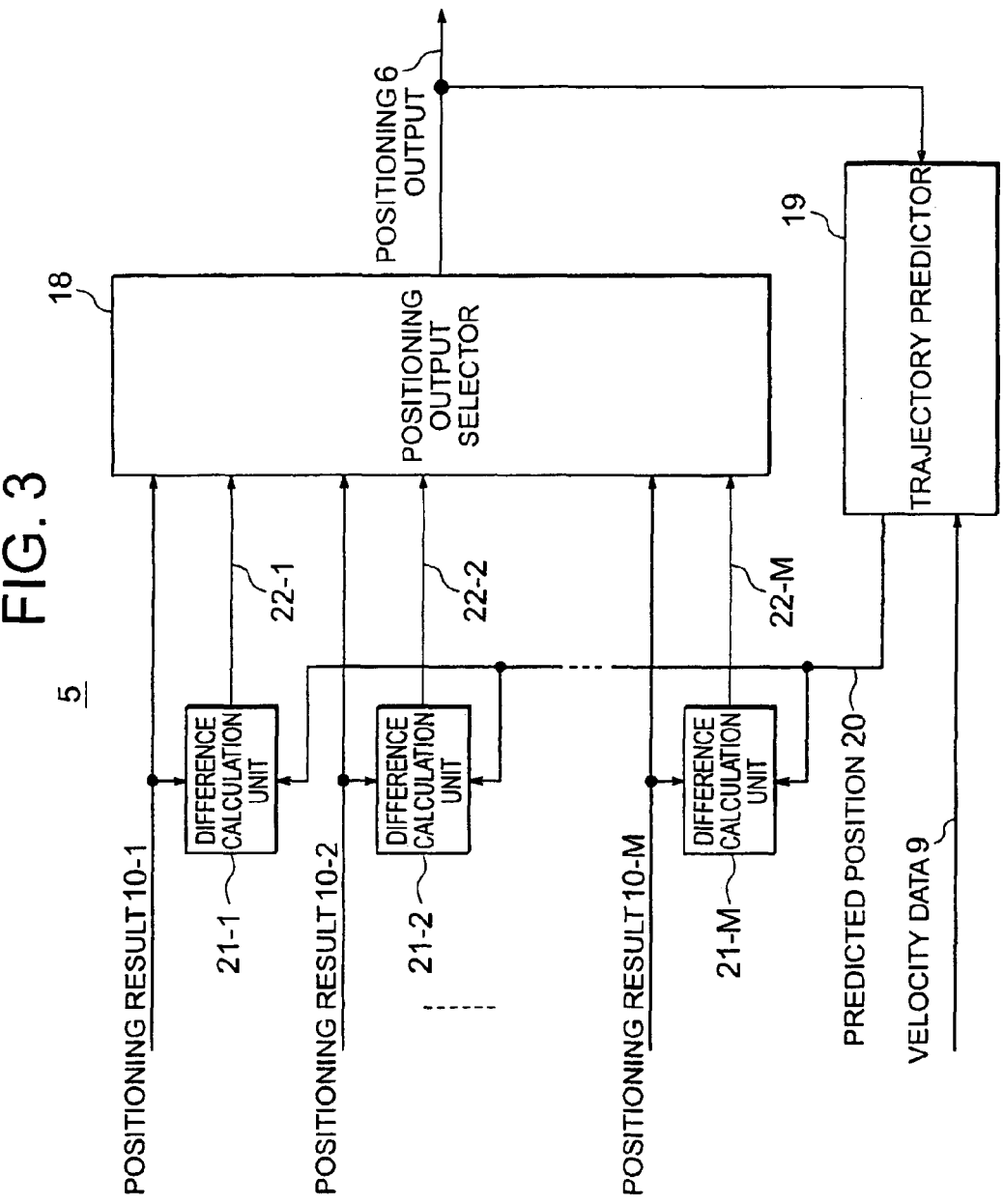
FIG. 3 is a block diagram showing a configuration of a positioning output determining unit of the positioning system in accordance with the first embodiment of the present invention.

FIG. 3 is a block diagram showing a configuration of the positioning output determining unit of the positioning system in accordance with the first embodiment.

In FIG. 3, reference numeral 18 denotes a positioning output selector for selecting an optimal result out of the positioning results 10-1 to 10-M to output it as a positioning output 6, 19 denotes an trajectory predictor in which the positioning output 6 is inputted, 20 is a predicted position that is an output of the trajectory predictor 19, reference numerals 21-1 to 21-M denote difference calculation units for calculating differences between the positioning results 10-1 to 10-M and the predicted position 20, and 22-1 to 22-M denote outputs of the difference calculation units 21-1 to 21-M.

Figure 4:
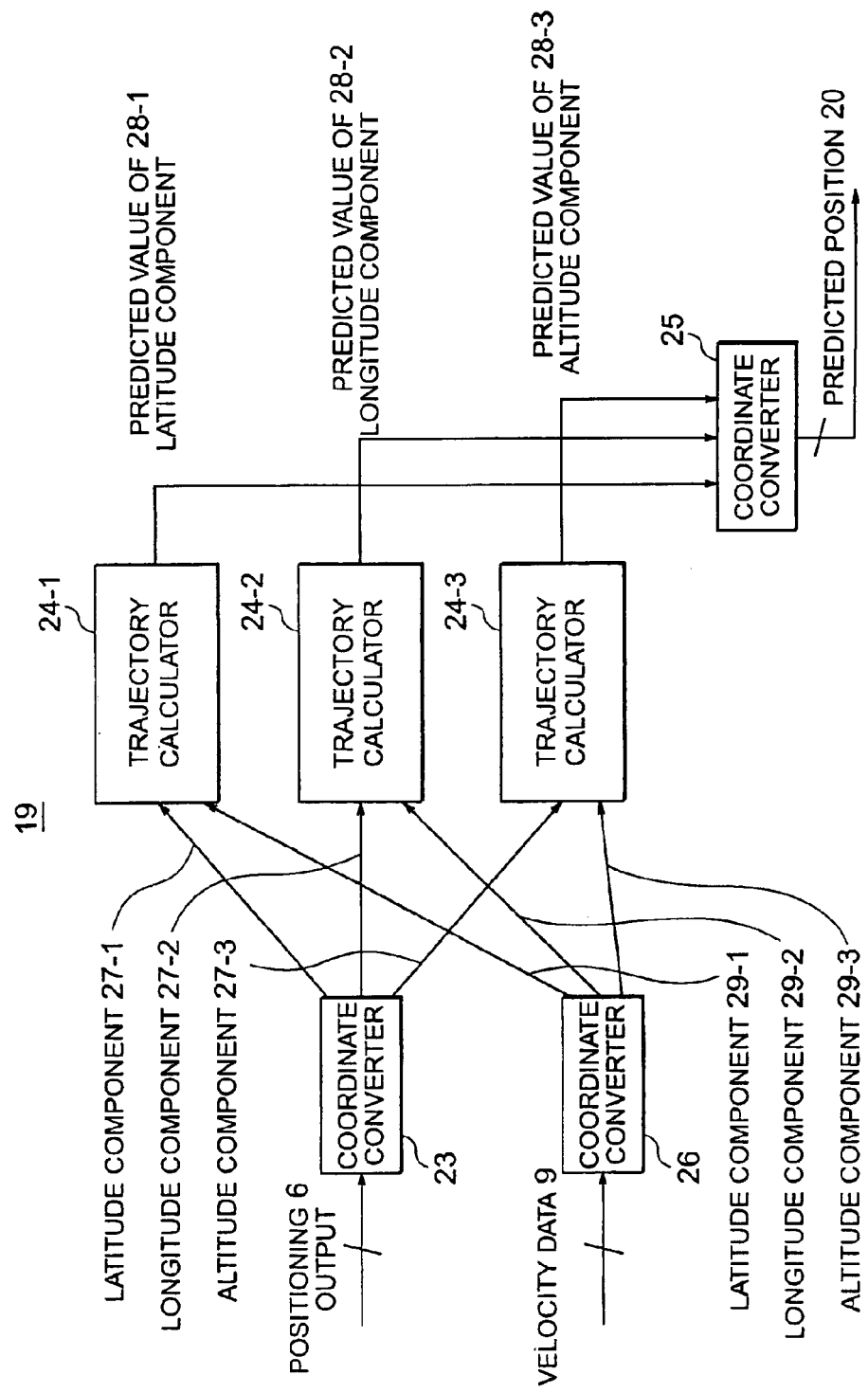
FIG. 4 is a block diagram showing a configuration of a trajectory predictor of the positioning output determining unit of the positioning system in accordance with the first embodiment of the present invention.

FIG. 4 is a block diagram showing a configuration of the trajectory predictor of the positioning output determining unit of the positioning system in accordance with the first embodiment.

In FIG. 4, reference numeral 23 denotes a coordinate converter for converting a coordinate system of the positioning output 6 to a coordinate system expressed by a latitude, a longitude and an altitude, 24-1 to 24-3 denote trajectory calculators to be applied to three components of a coordinate system to be used in the trajectory predictor 19, 25 denotes a coordinate converter for converting a coordinate system to which the trajectory calculators 24-1 to 24-3 are applied to a coordinate system of the predicted position 20, 26 denotes a coordinate converter for converting a coordinate system of the velocity data 9 to a coordinate system to be used in the trajectory predictor 19, 27-1 to 27-3 denote positioning outputs of each coordinate component that are outputs of the coordinate converter 23, 28-1 to 28-3 denote predicted values of each coordinate component of the trajectory calculators 24-1 to 24-3, and 29-1 to 29-3 denote pieces of velocity data of each coordinate component that are outputs of the coordinate converter 26.

Figure 5:
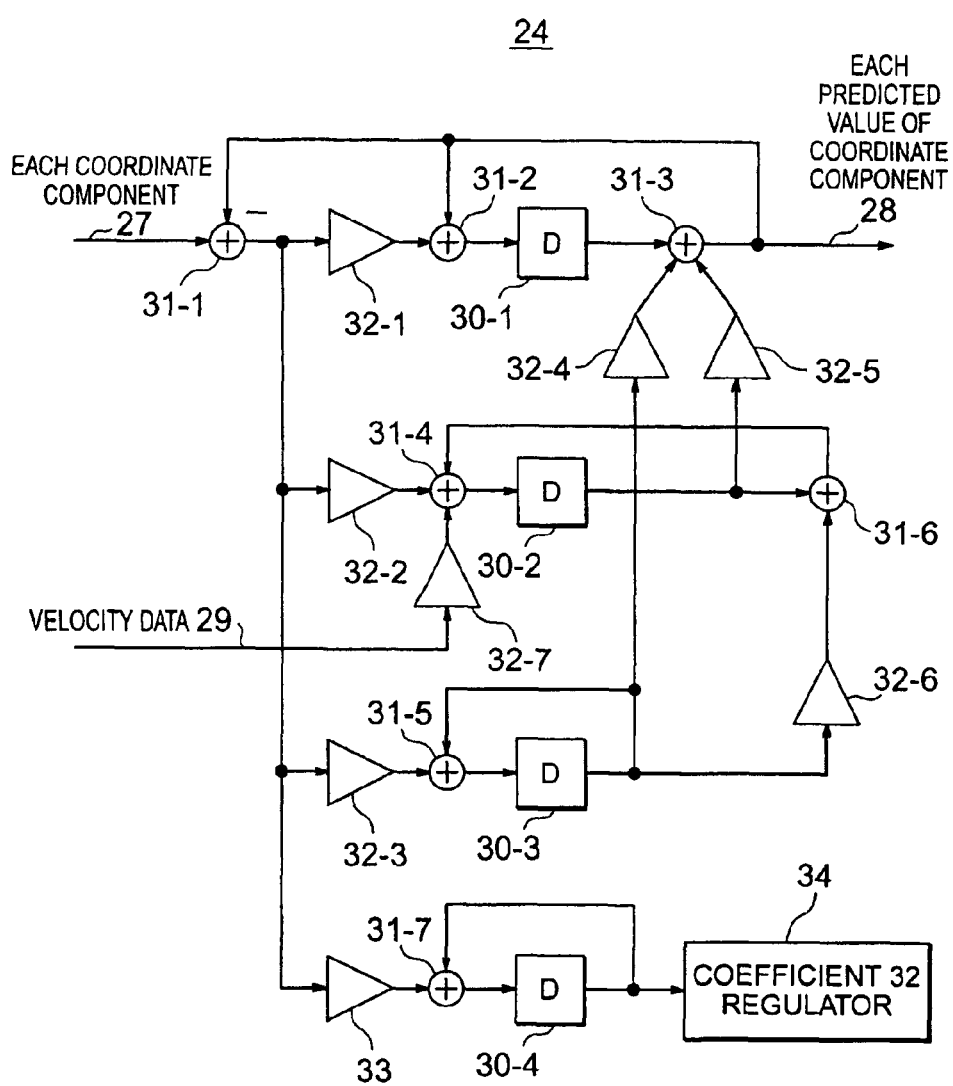
FIG. 5 is a diagram showing a configuration of a trajectory calculator of the trajectory predictor of the positioning output determining unit of the positioning system in accordance with the first embodiment of the present invention.

FIG. 5 is a diagram showing a configuration of the trajectory calculator of the trajectory predictor of the positioning output determining unit of the positioning system in accordance with the first embodiment.

In FIG. 5, reference numerals 30-1 to 30-4 denote memories indicating a delay of one sample time, 31-1 to 31-7 denote adders, 32-1 to 32-7 denote coefficient multipliers, 33 denotes a coefficient multiplier, and 34 denotes a coefficient 32 regulator for regulating coefficients of the coefficient multipliers 32-1 to 32-7 according to an input value.

On a signal line of each figure, a slash is inserted to clearly indicate that a plurality of signal lines exist.

Operations of the positioning system in accordance with the first embodiment will now be described with reference to the drawings.

As shown in FIG. 1, the satellite selector 2 selects a plurality of combinations of the object satellites of positioning calculation out of the data received from satellites 7-1 to 7-N, which the N channel receiver of positioning satellite signals 1 received, to output the satellite combination data 8-1 to 8-M.

The positioning calculator 3 performs positioning calculation with a list of the above-mentioned pieces of data as an object, that is, based on the data received from satellites 7-1 to 7-N and the satellite combination data 8-1 to 8-M to output results of the positioning calculation as the positioning results 10-1 to 10-M.

The positioning output determining unit 5 predicts a present position of the positioning system using the past positioning output 6 and the past and the present pieces of the velocity data 9 that are outputs of the velocity detector 4. The positioning output determining unit 5 selects a measurement result closest to the predicted position 20 out of the measurement results 10-1 to 10-M to output it.

Operations of the satellite selector 2 will now be described in detail.

As shown in FIG. 2, the satellite combination generator 11 outputs pieces of satellite combination data 15-1 to 15-P, which generate combinations of the number of satellites required for the positioning measurement, using satellite numbers (identification numbers of positioning satellites) of the data received from satellites 7-1 to 7-N. The signals of the satellite combination data 15-1 to 15-P are, for example, "1, 2, 3, 4" if the combination is that of satellite numbers 1 to 4.

The DOP calculator 12 calculates DOPs based on satellite position information (a pseudo distance ρ between a positioning satellite and a receiver, trajectory parameters of a positioning satellite, etc.) included in the data received from satellites 7-1 to 7-N with respect to the combinations to output them as the DOP values 16-1 to 16-P.

The aligning selector 13 outputs a selection signal 17 for selecting a subset of the satellite combination data 15-1 to 15-P including satellite combination data capable of obtaining an optimal positioning result based on these DOP values. This is, for example, a number list having extracted numbers of combinations selected out of combination data of 1 to P. A method of selection is to select the DOP values 16-1 to 16-P included in the range of the DOP in which positioning seems to be possible and select satellite combination data corresponding to these values.

The combination data selecting and outputting unit 14 outputs the satellite combination data selected out of the satellite combination data 15-1 to 15-P as 8-1 to 8-M.

Operations of the positioning output determining unit 5 will now be described in detail.

As shown in FIG. 3, the trajectory predictor 19 predicts a trajectory of the positioning system using the positioning output 6 and the velocity data 9. The difference calculation units 21-1 to 21-M calculate differences between the positioning results 10-1 to 10-M and the predicted position 20 that is an output of the trajectory predictor 19 to output difference calculation unit outputs 22-1 to 22-M. The positioning output selector 18 selects a positioning result closest to the predicted position 20 using these values to output it as the positioning output 6.

Operations of the trajectory predictor 19 will now be described.

It is important to select an appropriate coordinate system in predicting a trajectory. FIG. 4 shows, as an example, the trajectory predictor 19 in the case in which a coordinate system is selected in three direction of the latitude, the longitude and the altitude on the earth. It is obviously easy to change a coordinate system. The positioning output 6 and the velocity data 9 are subjected to coordinate conversion, respectively, and are inputted in the trajectory calculator 24-1 to 24-3 corresponding to each coordinate axis. The trajectory calculator 24 performs trajectory prediction calculation using a model that seems to be necessary.

FIG. 5 is a block diagram showing a configuration of a trajectory calculator assuming a uniform acceleration motion.

As shown in FIG. 5, respective coordinate components 27 are coordinate components of the positioning output 6. The velocity data 29 of each coordinate component is added to a part where a velocity component is predicted, whereby it becomes possible to capture information that cannot be obtained only from the positioning output 6 and to increase precision of the prediction.

The coefficient 32 regulator 34 is capable of estimating precision of the prediction by inputting an integrated value of errors between respective coordinate components 27 and respective coordinate component prediction values 28. It becomes possible to further increase the precision of the prediction by finely tuning the coefficients of the coefficient calculator 32 of the trajectory calculator 24 based on the input.

As shown in FIG. 4, the coordinate converter 25 of the orbit trajectory predictor 19 applies coordinate conversion to each coordinate component prediction value 28-1 to 28-3, thereby generating and outputting the predicted position 20.

Since the trajectory predictor 19 predicts and calculates a positioning position at the present time in accordance with a model using the past positioning output 6 and the past and the present pieces of velocity data 9, it is not susceptible to influence of a sudden disturbance component included in received data of the present time. In addition, predicting calculation in accordance with a model can eliminate high frequency noises. With these effects, the trajectory predictor 19 can output a smooth positioning trajectory output result. This is preferable to a user.

As described above, positioning calculation is performed with respect to a plurality of candidates of a satellite combination, respectively, and the positioning results and a predicted position at the time of positioning by a trajectory predicting calculation are compared to select an optimal positioning result, with the result of which high precision positioning that can cope with precision degradation not correlated to a DOP becomes possible. Moreover, since trajectory prediction of a positioning system is performed, a smooth positioning trajectory output result can be generated and a sudden disturbance can be eliminated.

Further, in the above-mentioned first embodiment, the positioning output determining unit 5 predicts a present position of the positioning system using the past positioning output 6 and the past and the present pieces of velocity data 9 that are outputs of the velocity detector 4 to thereby increase precision of prediction.

However, the present position of the positioning system can be predicted with a positioning output determining unit that uses the past positioning output 6 only without using the velocity data 9. In this positioning output determining unit, parts of the velocity detector 4, the coordinate converter 26 and the trajectory calculator 24 that predict a velocity component for the velocity data 9 becomes unnecessary, which may be deleted, respectively. In addition, in the trajectory calculator 24 of the positioning output determining unit 5 shown in FIG. 5, the positioning output determining unit using the positioning output 6 only can be realized simply by setting the coefficient of the coefficient multiplier 32-7 in which the velocity data 29 is inputted at zero. In this case, positioning that can cope with precision degradation or the like not correlated to a DOP also becomes possible. Moreover, since trajectory prediction of a positioning system is performed, it becomes possible to generate a smooth positioning trajectory output result and to eliminate a sudden disturbance.

Second Embodiment

A positioning system in accordance with a second embodiment of the present invention will be described with reference to the accompanying drawings.

Figure 6:
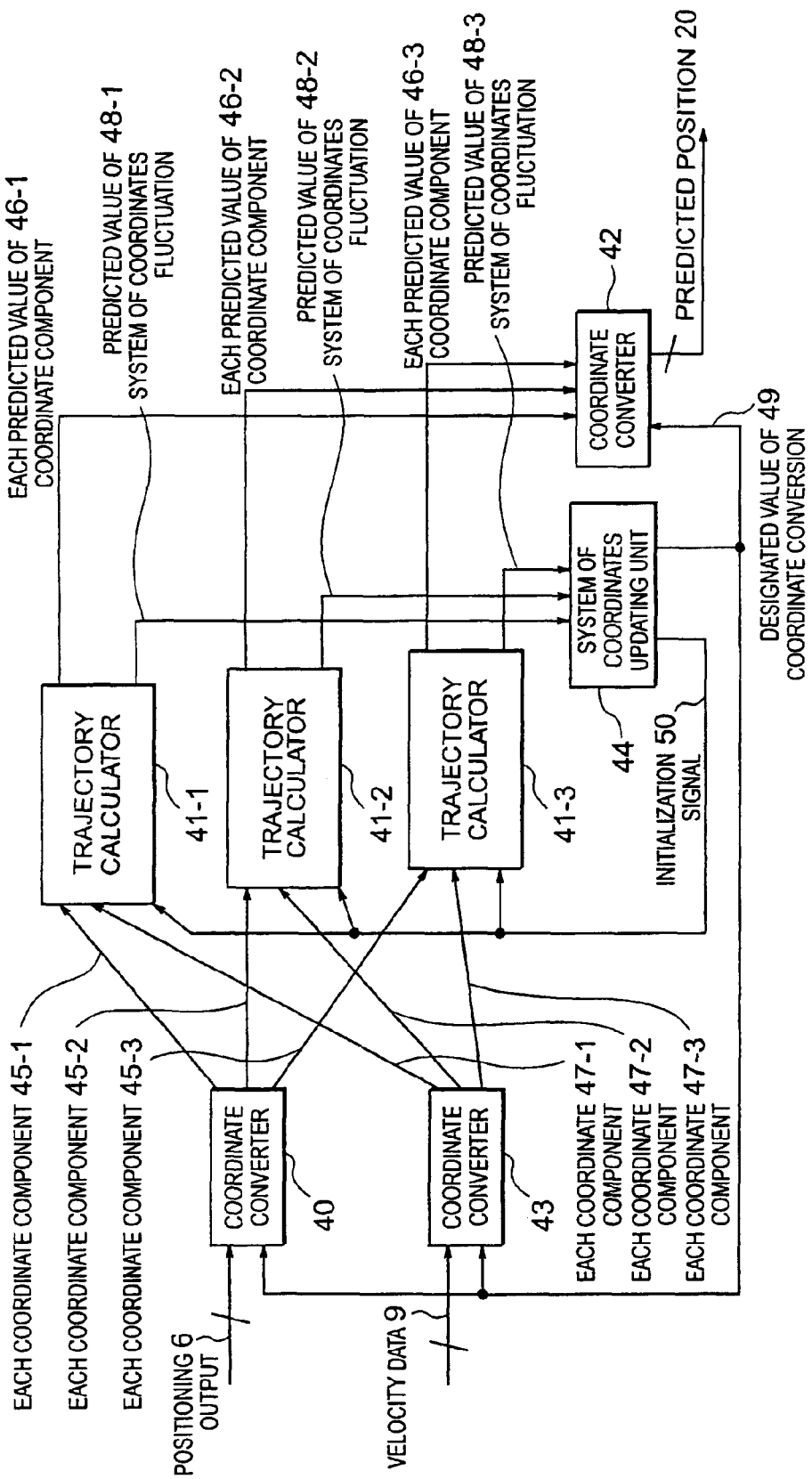
FIG. 6 is a block diagram showing a configuration of a trajectory predictor of a positioning output determining unit of a positioning system in accordance with a second embodiment of the present invention.

FIG. 6 is a block diagram showing a configuration of a trajectory predictor of a positioning system in accordance with the second embodiment of the present invention. Note that, configurations of other units are similar to those of the above-mentioned first embodiment.

In FIG. 6, reference numeral 40 denotes a coordinate converter for converting the positioning output 6 to a coordinate system to be used in trajectory calculators 41-1 to 41-3 (a coordinate system expressed by a latitude, a longitude and an altitude), 41-1 to 41-3 denote trajectory calculators for predicting and calculating a trajectory corresponding to each coordinate component, 42 denotes a coordinate converter for converting a predicted value of each coordinate component that is an output of the trajectory calculator 41 to the predicted position 20, 43 denotes a coordinate converter for converting the velocity data 9 to a coordinate system used in the trajectory calculators 41-1 to 41-3 (a coordinate system expressed by a latitude, a longitude and an altitude), and 44 denotes a coordinate system updating unit for updating a coordinate system used in predicting calculation using data for predicting that a trajectory of the positioning system fluctuates from a coordinate system currently used.

In addition, in the figure, reference numerals 45-1 to 45-3 denote coordinate components that are outputs of the coordinate converter 40, 46-1 to 46-3 denote predicted values of coordinate components that are outputs of the trajectory calculator 41, 47-1 to 47-3 denote coordinate components that are outputs of the coordinate converter 43, 48-1 to 48-3 denote outputs of the trajectory calculator 41 that are predicted values of coordinate system fluctuation for predicting that a trajectory of the positioning system fluctuates from a coordinate system currently used, 49 denotes a designated value for coordinate conversion that is coordinate conversion data of the coordinate converter 40, the coordinate converter 42 and the coordinate converter 43, and 50 denotes an initialization signal for, when the coordinate system updating unit 44 updates the designated value of coordinate conversion 49, notifying the trajectory calculator 41 of timing for the update.

Figure 7:
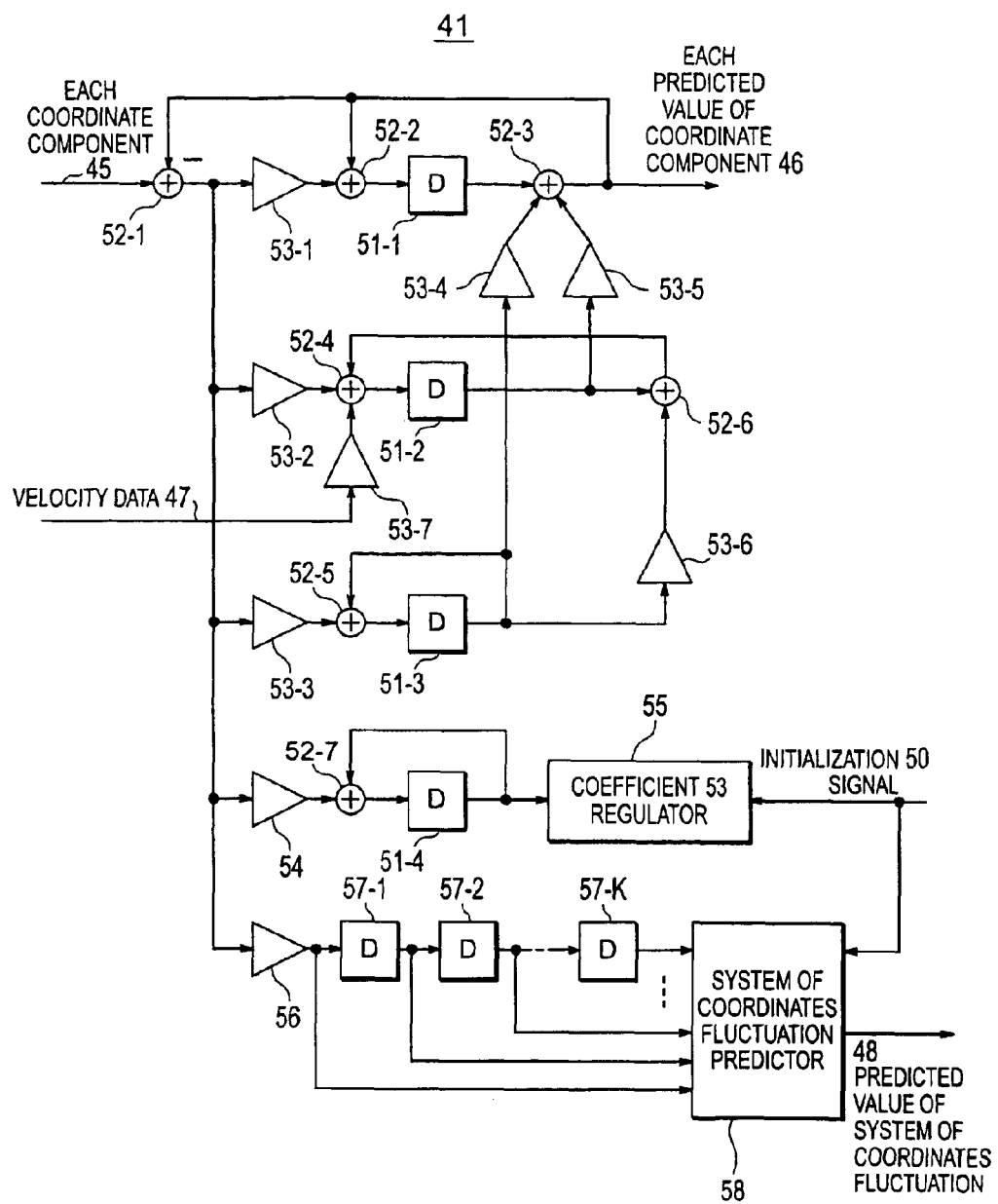
FIG. 7 is a diagram showing a configuration of an a trajectory calculator of the trajectory predictor of the positioning output determining unit of the positioning system in accordance with the second embodiment of the present invention.

FIG. 7 is a diagram showing a configuration of the trajectory calculator of the positioning system in accordance with the second embodiment.

In FIG. 7, reference numerals 51-1 to 51-4 denote memories indicating a delay of one sample time, 52-1 to 52-7 denote adders, 53-1 to 53-7 denote coefficient multipliers, 54 denotes a coefficient multiplier, 55 denotes a coefficient 53 regulator for integrating errors between each coordinate component 45 and each predicted value of coordinate component 46, thereby determining a state of the trajectory calculator 41 to regulate a coefficient of the coefficient multipliers 53, 56 denotes a coefficient multiplier, 57-1 to 57-K denote K memories for accumulating in time series an error between each coordinate component 45 and each predicted value of coordinate component 46, and 58 denotes a coordinate system fluctuation predictor for calculating a steady offset variation ratio of errors using an output of the coefficient multiplier 56 and outputs of the memories of 57-1 to 57-K to predict deviation of a trajectory of the positioning system and a coordinate axis used in the trajectory calculation.

Figure 8:
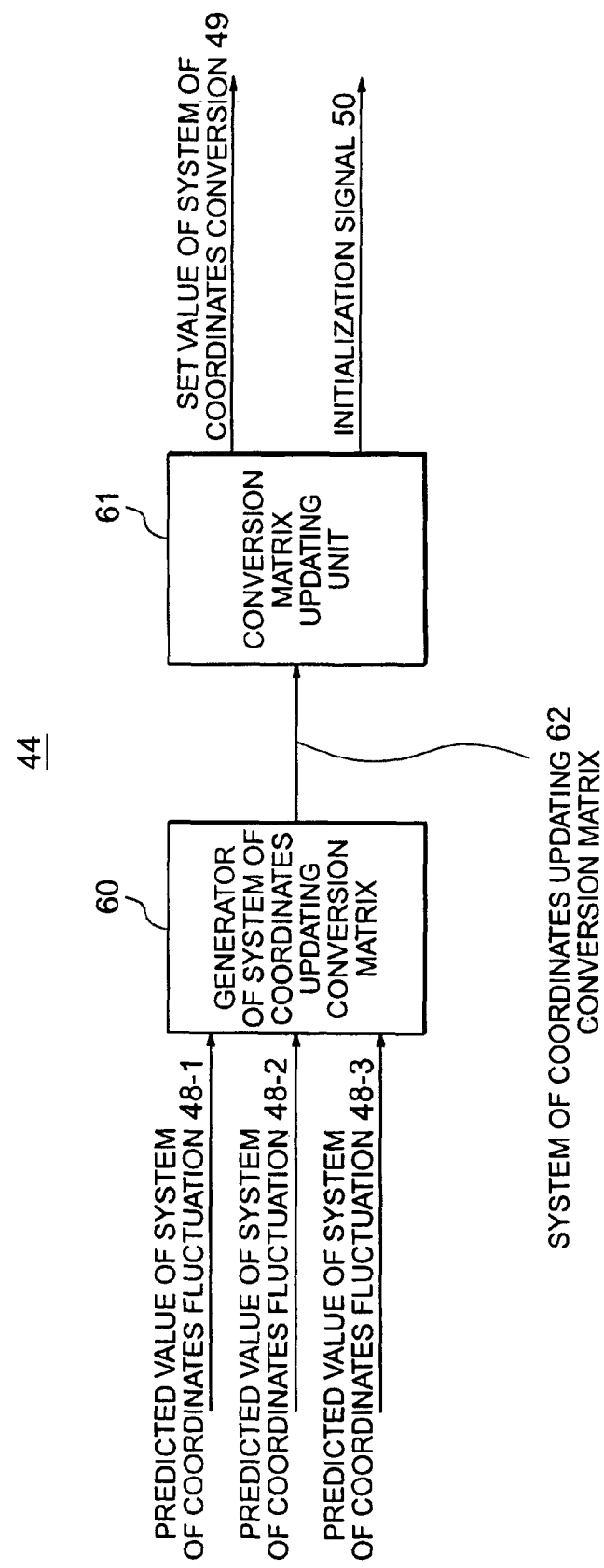
FIG. 8 is a block diagram showing a configuration of a coordinate system updating unit of the trajectory predictor of the positioning output determining unit of the positioning system in accordance with the second embodiment of the present invention.

FIG. 8 is a block diagram showing a configuration of a coordinate system updating unit of the positioning system in accordance with the second embodiment.

In FIG. 8, reference numeral 60 denotes a generator of coordinate system updating conversion matrix, 61 denotes a conversion matrix updating unit, and 62 denotes a coordinate system updating conversion matrix.

Operations of the positioning system in accordance with the second embodiment will now be described with reference to the drawings.

The trajectory calculator 41 of the second embodiment shown in FIG. 7 is different from the trajectory calculator 24 of the first embodiment shown in FIG. 5 in that the initialization signal 50 is inputted in the coefficient 53 regulator 55 and the coordinate system fluctuation predictor 58 exists.

This coefficient 53 regulator 55 increases a coefficient of the coefficient multiplier 53 for a short period of time at the time when the initialization signal 50 is inputted in order to cause the internal state of the trajectory calculator 41 to follow each coordinate component 45 at a high speed. Thus, the states of the memories 51-1 to 51-3 can reflect each coordinate component 45.

The coordinate system fluctuation predictor 58 calculates a steady offset variation ratio of errors using an output of the coefficient multiplier 56 and outputs of the memories 57-1 to 57-K. An error following a steady variation ratio including errors indicates a possibility that each coordinate component 45 moves on a straight line different from an assumed trajectory, that is, a coordinate axis employed by the trajectory calculator 41. It is possible to calculate an angle deviation between a present coordinate axis and an actual trajectory by calculating this variation ratio and then using a ratio between the calculated variation ratio and a distance moved or a predicted speed. The predicted values of a coordinate system variation 48-1 to 48-3 are calculated and outputted in this way.

The generator for coordinate system updating conversion matrix 60 shown in FIG. 8 calculates an angle deviation between each coordinate axis and a predicted trajectory using the predicted values of coordinate system fluctuation 48-1 to 48-3 and generates the coordinate system updating conversion matrix 62 that rotates a coordinate conversion matrix in the direction to compensate for the angle deviation. In addition, the conversion matrix updating unit 61 applies the coordinate system updating conversion matrix 62 to a present conversion matrix to update the conversion matrix.

If a trajectory of the positioning system is assumed to take a linear motion, it is possible to make a prediction of a trajectory more accurate by employing a coordinate system adapted to an actual trajectory. This can be explained from the fact that a difference between each coordinate component 45 and each predicted value of coordinate component 46 in the trajectory calculator 41 steadily becomes zero in the case where it is assumed that a positioning result without disturbance is obtained. When the trajectory calculator 41 employs a coordinate system different from trajectory the positioning system's trajectory, a steady error is generated on each coordinate axis.

Therefore, it can be expected that the trajectory predictor 19 of the second embodiment is more precise than the trajectory predictor 19 of the first embodiment.

As described above, since the trajectory predictor 19 performs an operation for sequentially adapting a coordinate system of trajectory calculation to an actual direction of the position system's trajectory, more precise positioning results using information of a plurality of positioning satellites can be outputted. In addition, it is also obvious that the trajectory predictor 19 of the second embodiment can be applied to the trajectory predictor 19 in a third embodiment to be described later.

Further, in the above-mentioned second embodiment, the positioning output determining unit 5 uses the past positioning output 6 and the past and the present pieces of velocity data 9 that are outputs of the velocity detector 4 to predict a present position of the positioning system, thereby improving precision of prediction.

However, a present position of the positioning system can be predicted with a positioning output determining unit that only uses the past positioning output 6 without using the velocity data 9. In this positioning output determining unit, parts of the velocity detector 4, the coordinate converter 43 and the trajectory calculator 41 that predict a velocity component for the velocity data 9 become unnecessary, which may be deleted, respectively. In addition, in the trajectory calculator 41 of the positioning output determining unit 5 shown in FIG. 7, the positioning output determining unit using the positioning output 6 only can be realized by simply setting the coefficient of the coefficient multiplier 53-7 in which the velocity data 47 is inputted at zero. In this case, there is an effect that positioning which can cope with precision degradation or the like not correlated to a DOP also becomes possible. Moreover, since trajectory prediction of a positioning system is performed, it becomes possible to generate a smooth positioning trajectory and to eliminate a sudden disturbance.

Third embodiment

A positioning system in accordance with the third embodiment of the present invention will be described with reference to the accompanying drawings.

Figure 9:
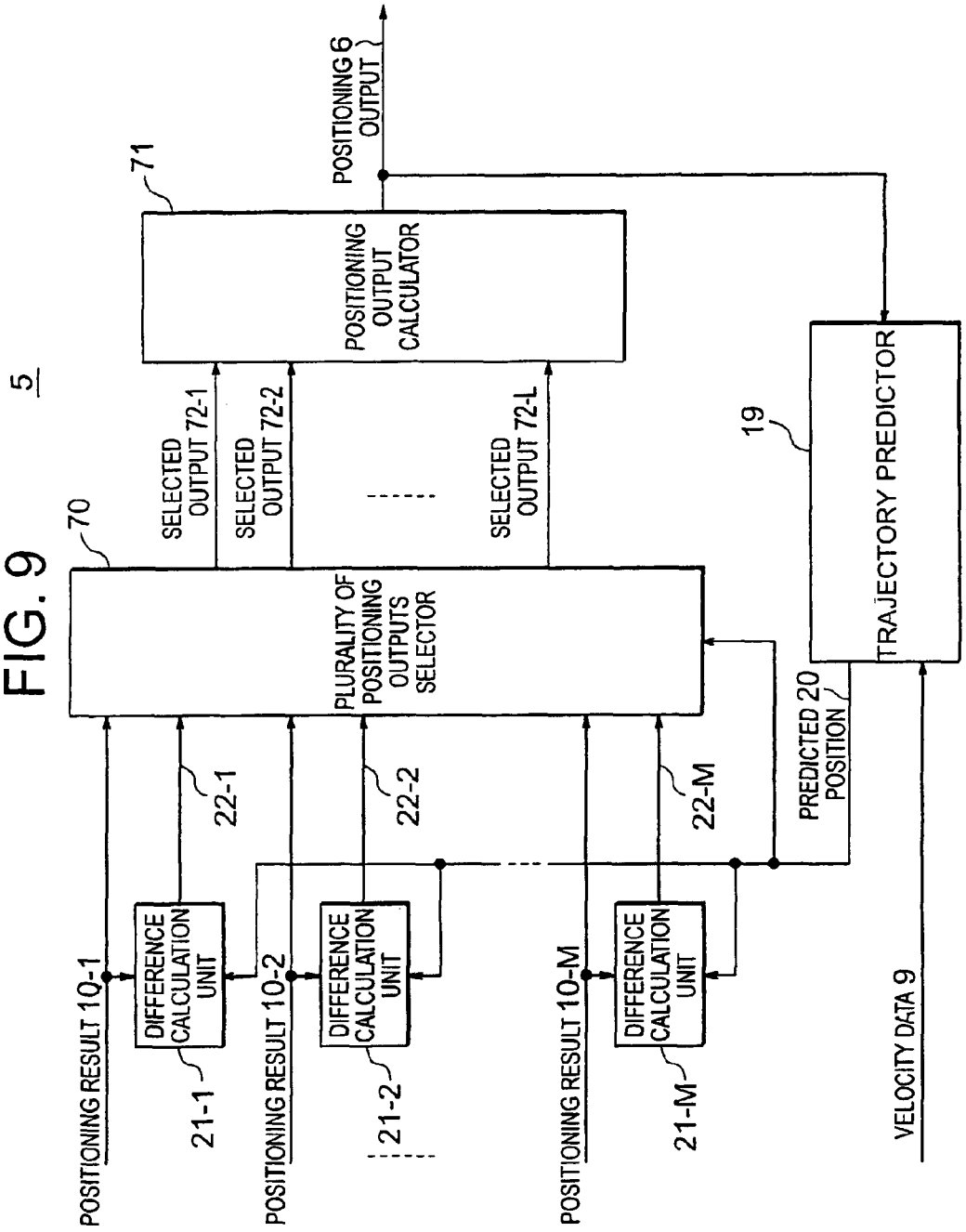
FIG. 9 is a block diagram showing a configuration of a positioning output determining unit of a positioning system in accordance with a third embodiment of the present invention.
Figure 10:
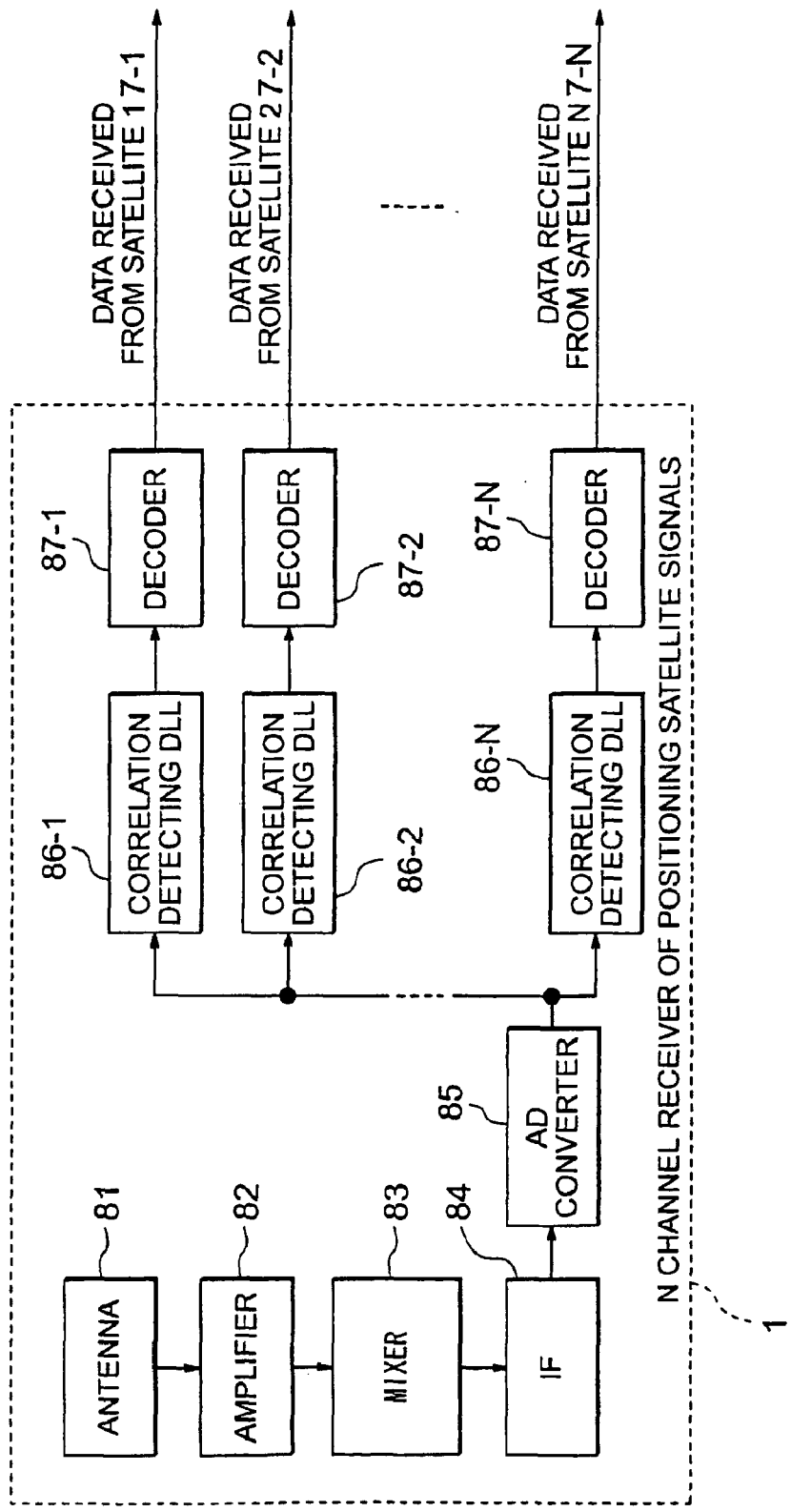
FIG. 10 is a block diagram showing a configuration of a conventional N channel receiver of positioning satellite signals.

FIG. 9 is a block diagram showing a configuration of a positioning output determining unit of the positioning system in accordance with the third embodiment of the present invention. Note that, configurations of other units are similar to those of the above-mentioned first embodiment.

In FIG. 9, reference numeral 70 denotes a plurality of positioning outputs selector for selecting a plurality of positioning results close to the predicted position 20 to output them, 71 denotes a positioning output calculator for calculating a positioning position using the plurality of selected outputs of the plurality of positioning outputs selector 70 to output it, 72-1 to 72-L denote selected outputs of the plurality of positioning outputs selector 70.

The third embodiment is different from the above-mentioned first embodiment in that a plurality of positioning results close to the predicted position 20 are selected instead of selecting one positioning result closest to the predicted position 20 to calculate the positioning output 6 using these values.

As a first example of the calculation, the positioning output calculator 71 calculates and outputs an average value of the selected outputs 72-1 to 72-L. In addition, as a second example of the calculation, a root mean square value of the selected outputs 72-1 to 72-L are calculated and outputted.

As described above, the positioning output 6 is calculated using a plurality of positioning results close to the predicted position 20, whereby it becomes possible to eliminate an error factor that is likely to be included in a selected one positioning result.

In addition, since a positioning output is calculated using a plurality of positioning results, a more precise positioning result using information of a plurality of positioning satellites can be outputted. In addition, it is also obvious that the positioning output determining unit 5 of the third embodiment can be applied to the positioning output determining unit 5 of the above-mentioned second embodiment.

Further, in the above-mentioned third embodiment, the positioning output determining unit 5 uses the past positioning output 6 and the past and the present pieces of velocity data 9 that are outputs of the velocity detector 4 to predict a present position of the positioning system, thereby improving precision of the prediction.

However, a present position of the positioning system can be predicted with a positioning output determining unit that only uses the past positioning output 6 without using the velocity data 9. In this positioning output determining unit, devices such as the velocity detector 4 relating to the velocity data become unnecessary, which may be deleted, respectively. Also in this case, as a result, there is an effect that the positioning becomes possible, which can also cope with precision degradation or the like not correlated to a DOP. Moreover, it becomes possible to generate a smooth positioning trajectory output result by performing trajectory prediction of a positioning system, whereby being capable of eliminating a sudden disturbance.

Thus, it is seen that a positioning system is provided. One skilled in the art will appreciate that the present invention can be practiced by other than the preferred embodiments which are presented for the purposes of illustration and not of limitation, and the present invention is limited only by the claims which follow.

What is claimed is:

1. A positioning system comprising:
    a receiver for receiving signals from a plurality of positioning satellites to output data received from the positioning satellites;
    a satellite selector for selecting a plurality of combinations of positioning satellites to be objects of positioning calculation based on the data received from the positioning satellites to output satellite combination data;
    a positioning calculator for performing positioning calculations based on the data received from the positioning satellites and the satellite combination data to output positioning results thereof; and
    a positioning output determining unit for selecting a positioning result from among the positioning results that is closest to a predicted position to output the selected positioning result as a positioning output.

2. A positioning system according to claim 1,
    wherein said satellite selector includes:
    a satellite combination generator for generating second satellite combination data that combines the data received from satellites;
    a DOP calculator for calculating a DOP using the second satellite combination data based on the data received from the positioning satellites to output a DOP value;
    an aligning selector for aligning the plurality of DOP values to select a subset according to sizes of the DOP values; and a combination data selecting and outputting unit for selecting a subset of outputs of said satellite combination generator using outputs of said aligning selector to output the satellite combination data.

3. A positioning system according to claim 1, wherein said positioning output determining unit includes:

a positioning output selector for selecting a positioning result closest to a predicted position using the positioning results and a difference between the positioning results and the predicted position to output the positioning result as a positioning output;

a trajectory predictor for predicting a trajectory of said positioning system using the positioning output to output the predicted position; and a difference calculation unit for calculating a difference between the positioning results and the predicted position.

4. A positioning system according to claim 3, wherein said trajectory predictor includes:

a first coordinate converter for converting a coordinate system of the positioning output to a first coordinate system expressed by a latitude, a longitude and an altitude;

a trajectory calculator for performing trajectory predicting calculation using a predetermined model based on the first coordinate system and outputting a predicted value of a second coordinate system expressed by a latitude, a longitude and an altitude; and a second coordinate converter for converting the predicted value of the second coordinate system to the coordinate system of the predicted position.

5. A positioning system according to claim 4, wherein said trajectory calculator performs trajectory predicting calculation on an assumption that said positioning system is taking a uniform acceleration motion.

6. A positioning system according to claim 1, wherein said positioning output determining unit includes:

a selector for selecting a plurality of positioning results close to the predicted position using the positioning result and a difference between the positioning result and the predicted position to output them as selected outputs;

a positioning output calculator for calculating a position using a plurality of selected outputs of said selector to output it as a positioning output;

a trajectory predictor for predicting a trajectory of said positioning system using the positioning output to output the predicted position; and a difference calculation unit for calculating a difference between the positioning result and the predicted position.

7. A positioning system according to claim 3, wherein said trajectory predictor includes:

a first coordinate converter for converting a coordinate system of the positioning output to a first coordinate system expressed by a latitude, a longitude and an altitude;

a trajectory calculator for performing trajectory predicting calculation using a predetermined model based on the first coordinate system and outputting a predicted value of a second coordinate system expressed by a latitude, a longitude and an altitude, and at the same time outputting a predicted value of coordinate system fluctuation for predicting that a trajectory of said positioning system fluctuates from a coordinate system currently used;

a second coordinate converter for converting the predicted value of the second coordinate system to the coordinate system of the predicted position; and a coordinate system updating unit for updating a coordinate system to be used in trajectory predicting calculation based on the predicted value of coordinate system fluctuation.

8. A positioning system according to claim 7, wherein said trajectory calculator performs trajectory predicting calculation on an assumption that said positioning system is moving on a predetermined straight line.

9. A positioning system according to claim 7, wherein said coordinate system updating unit includes:

a generator of coordinate system updating conversion matrix for calculating an angle deviation between each coordinate axis and predicted trajectory using the predicted value of coordinate system fluctuation to generate a coordinate system updating conversion matrix that rotates a coordinate conversion matrix in the direction for compensating for the angle deviation; and a conversion matrix updating unit for applying said coordinate system updating conversion matrix to a present conversion matrix to update the conversion matrix.

10. A positioning system comprising:

a receiver for receiving signals from a plurality of positioning satellites to output data received from positioning satellites;

a satellite selector for selecting a plurality of combinations of the positioning satellites to be objects of positioning calculation based on the data received from the positioning satellites to output satellite combination data;

a positioning calculator for performing positioning calculations based on the data received from the positioning satellites and the satellite combination data to output positioning results thereof;

a velocity detector for detecting a velocity of said positioning system to output velocity data; and a positioning output determining unit for selecting a positioning result from among the positioning results that is closest to a predicted position to output the selected positioning result as a positioning output, wherein the predicted position is based on the velocity data.

11. A positioning system according to claim 10, wherein said satellite selector includes:

a satellite combination generator for generating second satellite combination data that combines the data received from the positioning satellites;

a DOP calculator for calculating a DOP using the second satellite combination data based on the data received from the positioning satellites to output a DOP value;

an aligning selector for aligning the plurality of DOP values, thereby selecting a subset according to sizes of the values; and a combination data selecting and outputting unit for selecting a subset of outputs of said satellite combination generator using outputs of said aligning selector to output the satellite combination data.

12. A positioning system according to claim 10,
wherein said positioning output determining unit includes:
a positioning output selector for selecting a positioning result closest to a predicted position using the positioning results and a difference between the positioning results and the predicted position to output the positioning result as a positioning output;
a trajectory predictor for predicting a trajectory of a positioning system using the positioning output and the velocity data to output the predicted position; and
a difference calculation unit for calculating a difference between the positioning results and the predicted position.

13. A positioning system according to claim 12,
wherein said trajectory predictor includes:
a first coordinate converter for converting a coordinate system of said positioning output to a first coordinate system expressed by a latitude, a longitude and an altitude;
a second coordinate converter for converting a coordinate system of the velocity data to a second coordinate system expressed by a latitude, a longitude and an altitude;
a trajectory calculator for performing trajectory predicting calculation using a predetermined model based on the first and second systems of coordinates and outputting a predicted valued of a third coordinate system expressed by a latitude, a longitude and an altitude; and
a third coordinate converter for converting the predicted value of the third coordinate system to the coordinate system of the predicted position.

14. A positioning system according to claim 13,
wherein said trajectory calculator performs the trajectory predicting calculation on an assumption that said positioning system is taking a uniform acceleration motion.

15. A positioning system according to claim 10,
wherein said positioning output determining unit includes:
a selector for selecting a plurality of positioning results close to the predicted position using the positioning result and a difference between the positioning result and a predicted position to output them as selected outputs;
a positioning output calculator for calculating a position using a plurality of selected outputs of said selector to output it as a positioning output;
a trajectory predictor for predicting a trajectory of said positioning system using the positioning output and the velocity data to output the predicted position; and
a difference calculation unit for calculating a difference between the positioning result and the predicted position.

16. A positioning system according to claim 12,
wherein said trajectory predictor includes:
a first coordinate converter for converting a coordinate system of the positioning output to a first coordinate system expressed by a latitude, a longitude and an altitude;
a second coordinate converter for converting a coordinate system of the velocity data to a second coordinate system expressed by a latitude, a longitude and an altitude;
a trajectory calculator for performing trajectory predicting calculation using a predetermined model based on the first and second systems of coordinates and outputting a predicted value of a third coordinate system expressed by a latitude, a longitude and an altitude, and at the same time outputting a predicted value of coordinate system fluctuation for predicting that a trajectory of said positioning system fluctuates from a coordinate system currently used;
a third coordinate converter for converting the predicted value of the third coordinate system to the coordinate system of the predicted position; and
a coordinate system updating unit for updating a coordinate system to be used in trajectory predicting calculation based on the predicted value of coordinate system fluctuation.

17. A positioning system according to claim 16,
wherein said trajectory calculator performs trajectory predicting calculation on an assumption that said positioning system is moving on a predetermined straight line.

18. A positioning system according to claim 16,
wherein said coordinate system updating unit includes:
a generator of coordinate system updating conversion matrix for calculating an angle deviation between each coordinate axis and a predicted trajectory using the predicted value of coordinate system fluctuation to generate a coordinate system updating conversion matrix that rotates a coordinate conversion matrix in a direction for compensating for the angle deviation; and
a conversion matrix updating unit for applying said coordinate system updating conversion matrix to a present conversion matrix to update the conversion matrix.

19. A positioning system according to claim 6,
wherein said trajectory predictor includes:
a first coordinate converter for converting a coordinate system of the positioning output to a first coordinate system expressed by a latitude, a longitude and an altitude;
a trajectory calculator for performing trajectory predicting calculation using a predetermined model based on the first coordinate system and outputting a predicted value of a second coordinate system expressed by a latitude, a longitude and an altitude, and at the same time outputting a predicted value of coordinate system fluctuation for predicting that a trajectory of said positioning system fluctuates from a coordinate system currently used;
a second coordinate converter for converting the predicted value of the second coordinate system to the coordinate system of the predicted position; and
a coordinate system updating unit for updating a coordinate system to be used in trajectory predicting calculation based on the predicted value of coordinate system fluctuation.

20. A positioning system according to claim 15,
wherein said trajectory predictor includes:
a first coordinate converter for converting a coordinate system of the positioning output to a first coordinate system expressed by a latitude, a longitude and an altitude;
a second coordinate converter for converting a coordinate system of the velocity data to a second coordinate system expressed by a latitude, a longitude and an altitude;

a trajectory calculator for performing trajectory predicting calculation using a predetermined model based on the first and second systems of coordinates and outputting a predicted value of a third coordinate system expressed by a latitude, a longitude and an altitude, and at the same time outputting a predicted value of coordinate system fluctuation for predicting that a trajectory of said positioning system fluctuates from a coordinate system currently used;

a third coordinate converter for converting the predicted value of the third coordinate system to the coordinate system of the predicted position; and a coordinate system updating unit for updating a coordinate system to be used in trajectory predicting calculation based on the predicted value of coordinate system fluctuation.

* * * * *

UNITED STATES PATENT AND TRADEMARK OFFICE
CERTIFICATE OF CORRECTION

PATENT NO. : 6,917,330 B2
DATED : July 12, 2005
INVENTOR(S) : Yuji Ohmura et al.

It is certified that error appears in the above-identified patent and that said Letters Patent is hereby corrected as shown below:

Column 1,
Line 45, "Electric waves" and insert -- Electromagnetic waves --;
Lines 46-47, delete "electric waves" and insert -- electromagnetic waves --.

Column 2,
Line 12, delete "$(A^T \cdot A)^{-1}$" and insert -- $(A^T \cdot A)^{-1}$ --.

Signed and Sealed this

Twenty-ninth Day of November, 2005

JON W. DUDAS
*Director of the United States Patent and Trademark Office*